Figure 1:
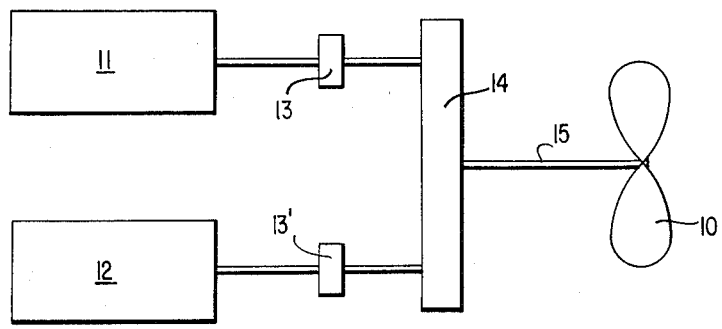

Feb. 1, 1966 M. H. BURCKHARDT 3,232,138
DRIVE CONNECTION
Filed April 30, 1963 2 Sheets-Sheet 1

INVENTOR.
MANFRED H. BURCKHARDT
BY Dicke & Craig
ATTORNEYS.

Feb. 1, 1966    M. H. BURCKHARDT    3,232,138
DRIVE CONNECTION
Filed April 30, 1963    2 Sheets-Sheet 2

INVENTOR.
MANFRED H. BURCKHARDT
BY Dicke + Craig
ATTORNEYS.

United States Patent Office 3,232,138
Patented Feb. 1, 1966

3,232,138
DRIVE CONNECTION
Manfred H. Burckhardt, Waiblingen, Germany, assignor to Daimler-Benz Aktiengesellschaft, Stuttgart-Unterturkheim, Germany
Filed Apr. 30, 1963, Ser. No. 276,748
19 Claims. (Cl. 74—665)

The present invention relates to a free-wheeling arrangement for drivingly coupling one or several large propulsive outputs to a common driven means, especially for multi-engine installations in marine propulsion systems.

Engine installations are known in the prior art in which several driving engines work by way of a combining gear assembly with a common shaft, for example, in marine propulsion systems with a weaker engine for slow speeds and a stronger engine for full-load speeds. The drive units are thereby adapted to be selectively added in the drive connection and in case of loss or breakdown of one drive unit, for example, by reason of piston seizing or jamming, etc., the overall installation has to be able to continue to operate without impairment.

This could be achieved by the installation of freewheeling devices in each shafting connection. Mechanical free-wheeling devices, however, are not absolutely reliable and additionally cannot be manufactured with reasonable expenditures for large loads. While hydrodynamic couplings are known in the prior art for such drives, such hydrodynamic couplings are not suitable in the normal construction thereof for such free-wheeling effect. Also the simple discharge or emptying of such a prior art coupling is not sufficient for the intended purposes as such a coupling absorbs far too large a moment during the emptying period or discharge time. Special constructions, as, for example, unilaterally swingable blades at the secondary part are expensive in manufacture and assembly and nonetheless not absolutely reliable in operation.

The present invention aims at the elimination of the aforementioned disadvantages.

The present invention solves the underlying problems with the arrangements of the type mentioned hereinabove by interposing in each shafting connection between the input and output as free-wheeling device a hydrodynamic coupling with blades that are inclined obliquely in the forward direction. If so desired, a mechanical free-wheeling device may be connected beind the coupling in accordance with the present invention.

The free-wheeling arrangement according to the present invention is simple in construction and absolutely safe in operation. The vibration damping effect of the hydrodynamic coupling is retained in its full effect. Additionally, the coupling has a larger transmitting capacity in the forward direction of rotation and, therefore, can be constructed of smaller dimensions. Any mechanical freewheeling device that may be connected behind the coupling in accordance with the present invention is protected to a very large degree because by reason of the considerably reduced moment input capacity in the backward direction of rotation it does not suddenly spring-back out of the blocking position as with a mechanical free-wheeling device but instead is slowly disengaged.

However, it is equally appropriate if the hydrodynamic coupling constructed as a free-wheeling device serves simultaneously as a pulse transmitter which becomes responsive approximately at a rotational speed difference of zero betwen the primary and secondary part of the hydrodynamic coupling. A disengageable coupling or clutch of any suitable construction may be controlled either indirectly or directly by means of this pulse which is arranged between the hydrodynamic coupling and the output.

According to a further feature of the present invention, the hydrodynamic coupling operative as a free-wheeling device may simultaneously serve itself as disengageable clutch and for that purpose is adapted to be emptied or discharged automatically when passing through a rotational speed difference of zero. In this manner an amazingly and surprisingly simple overall construction is achieved without separate additional structure parts or even entire aggregates or units.

In one embodiment according to the present invention the blades of the hydrodynamic coupling at the primary part thereof are disposed, as seen unrolled or unwound in a single plane, with a forward inclination, and the blades at the secondary part are inclined in the same direction. The pulse transmitter is appropriately constructed as a control valve operatively associated with both parts of the hydrodynamic coupling which valve in the first end position thereof blocks an oil pressure and in the second end position thereof opens the path to the oil pressure. A disengageable separating clutch or the hydrodynamic coupling itself may be controlled either indirectly or directly by means of this oil pressure.

A ring arranged between the primary shaft and the secondary shaft serves as a control valve for the discharge valves. This ring is adapted to be rotated, relative to a pulling primary shaft, by the friction at the secondary shaft against the effect of a spring, into a first end position blocking the oil flow to the discharge valves. With the occurrence of a rotational speed difference equal to zero or with the secondary shaft overtaking the primary shaft, the ring is adapted to be displaced by the spring effect and the friction at the secondary shaft into its second end position in which it frees the oil flow. Several discharge valves and radially extending apertures are arranged in the rotating housing forming the primary shell member or coupling part along the circumference thereof, which discharge valves are retained in the closure position thereof by springs and are opened in unison by the oil pressure released by the control valve.

Accordingly, it is an object of the present invention to provide a drive installation for multi-drive units of the type described herein above which effectively eliminates by simple and reliable means the shortcomings and inadequacies encountered with the prior art constructions.

It is another object of the present invention to provide a drive installation for a common output shaft adapted to be driven by one or several drive units which obviates the need for mechanical free-wheeling devices that are relatively costly to manufacture in order to withstand the large loads that may be expected with the types of installations.

A still further object of the present invention resides in the provision of a drive installation for multi-drive units which effectively provides a free-wheeling device that is simple to manufacture and assemble, absolutely reliable in operation and relatively small in its spatial requirements.

A further object of the present invention resides in the provision of a hydrodynamic coupling operatively interconnected in the shaft connections which retains fully the vibration-absorbing characteristics of the hydrodynamic coupling, yet results in an extremely simple overall construction eliminating the need for any separate structural parts or control units.

Another object of the present invention resides in the provision of a control system for a multi-drive installation which enables by extremely simple and compact means an extraordinary reliable valving of oil pressure responsive to the rotational speed difference between the primary and secondary part of the hydrodynamic coupling.

Another object of the present invention resides in the provision of a hydrodynamic coupling construction and blade arrangement which is particularly suitable for free-wheeling purposes in a multi-drive propulsion system of the type described hereinabove, yet permits small dimensions and short overall lengths of the various hydrodynamic couplings used.

Figure 2:
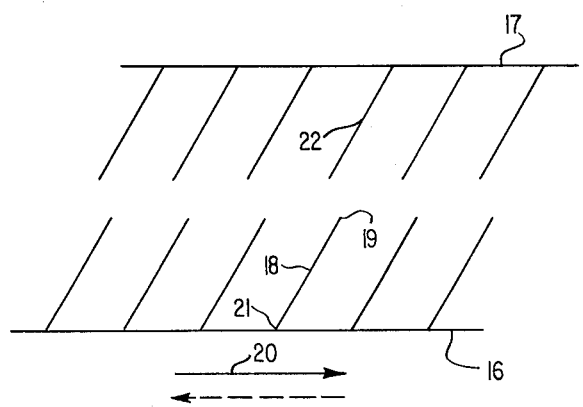
Figure 3:
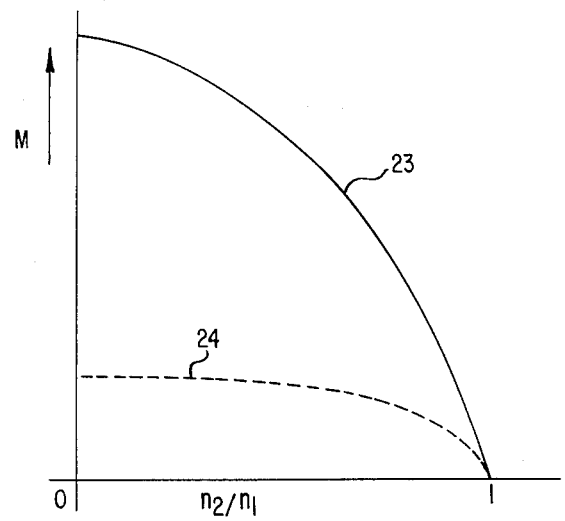
Figure 4:
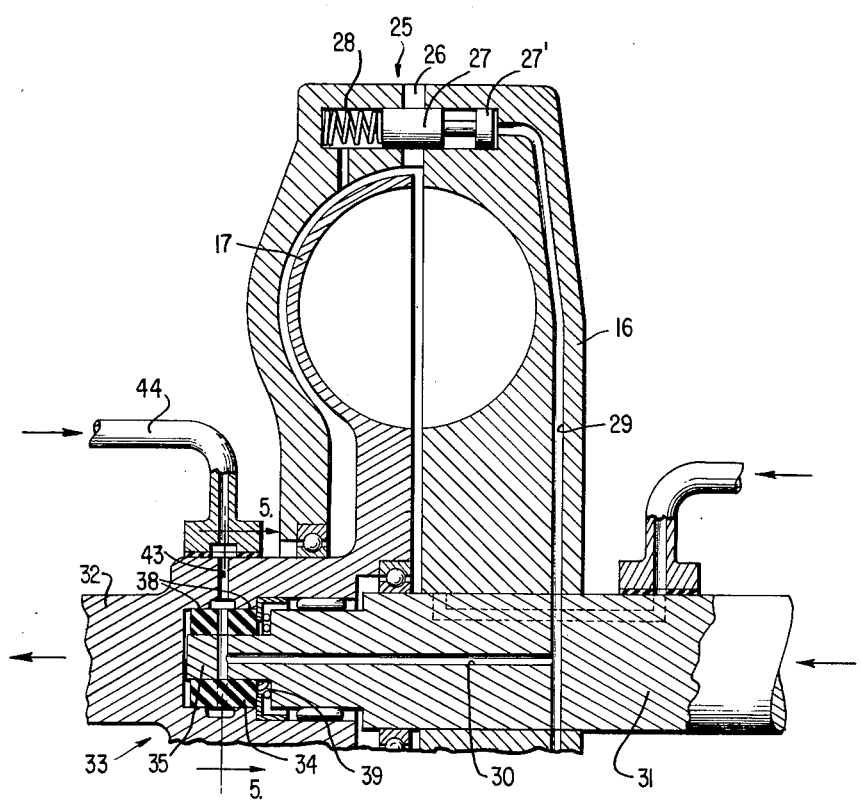
Figure 5:
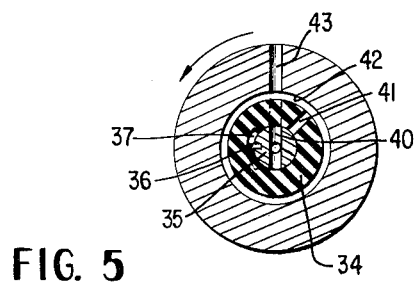

These and other objects, features and advantages of the present invention will become more obvious from the following description when taken in connection with the accompanying drawing which shows, for purposes of illustration only, one embodiment in accordance with the present invention, and wherein:

FIGURE 1 is a schematic view of the overall arrangement of a propulsion system in accordance with the present invention, FIGURE 2 is a schematic view illustrating the blade position of the hydrodynamic coupling in accordance with the present invention, unrolled into the plane of the drawing, FIGURE 3 is a diagram illustrating the moment input capacity of the hydrodynamic coupling in accordance with the present invention plotted against the speed ratios of the secondary to the primary coupling part, FIGURE 4 is a partial longitudinal cross sectional view through a hydrodynamic coupling in accordance with the present invention, and FIGURE 5 is a cross sectional view taken along line V—V of FIGURE 4.

Referring now to the drawing wherein like reference numerals are used throughout the various views to designate like parts, and more particularly to FIGURES 1 and 2, two similar or two different engines 11 and 12 (FIGURE 1) serve for the drive or propulsion of a ship's propeller 10. Both engines 11 and 12 are operatively connected by way of hydrodynamic couplings 13 and 13' operable as free-wheeling devices with a combining transmission 14 of conventional construction from which is driven the propeller shaft 15 of the ship's propeller 10. Of course, the present invention is not limited to a drive installation with two engines but is also applicable to drive installations with more than two engines. The combining gear arrangement 14 is provided in each case with a suitable number of inputs as is well known.

The hydrodynamic couplings 13 and 13' provided as free-wheeling devices each have a primary shell member or coupling part 16 and a secondary shell member or coupling part 17 (FIGURE 2). The blades 18 at the primary member 16 are inclined in the forward direction, that is, the radially extending edges 19 disposed opposite the secondary part 17 are displaced with respect to the blade bases or roots 21 in the forward direction of rotation indicated by the full line arrow 20. A similar inclination is provided at the blades 22 of the secondary part 17.

The particular blading position illustrated in FIGURE 2 has as consequence that the coupling has an intentionally large moment input capacity in the forward direction of rotation with a pulling primary shell member or coupling part 16 which corresponds to the curve 23 of FIGURE 3. Consequently, the hydrodynamic coupling in accordance with the present invention may already be constructed of smaller dimensions than a normally constructed hydrodynamic coupling. If for any reason the primary coupling part 16 now stops—which corresponds to a backward direction of rotation of the primary part with respect to the secondary part—for example, when the respective driving engine 11 or 12 is blocked or jammed, then the moment input capacity of the correspondingly coupling drops to a considerably smaller value according to the curve 24 in FIGURE 3. With corresponding design and selection of the angle of blade inclination the moment input capacity in the forward direction of rotation may be approximately 5 to 10 times as large as the moment input capacity in the backward direction of rotation indicated by the curve 24.

According to the embodiment of FIGURES 4 and 5, the primary shell member or coupling part 16 forms a housing generally designated by reference numeral 25 which surrounds the secondary shell member or coupling part 17. Several radial discharge bores 26 are arranged within the housing 25 along the circumference thereof which are normally closed by an axially arranged valve piston 27 or the like. A spring 28 normally holds the piston 27 in the position thereof in which it closes the bore 26. A partial piston 27' is provided at each piston 27 for purposes of opening of a respective bore 26 which partial piston 27' is adapted to be acted upon with pressure oil by way of a line 29. The line 29 passes over into an axial bore 30 in the primary shaft 31.

A control valve generally designated by reference numeral 33 is provided between the primary shaft 31 and the secondary shaft 32 which valve 33 automatically opens the path to the pressure oil by way of bores 29 and 30 upon passing through the rotational speed difference of zero between the primary and secondary shafts 31 and 32. This control valve 33 is constituted by an annular member 34 which is rotatably supported within predetermined limits on a pin portion 35 formed by an extension of the primary shaft 31. An abutment 36 in the pin portion 35 determines with the aid of a segmental cut-out or aperture 37 the two end positions of the annular member 34 with respect to the pin portion 35.

The annular member 34 abuts externally thereof in frictional engagement against the surfaces 38 of the secondary shaft 32. A spring 39 constantly urges to shift or displace the annular member 34 from the end position thereof illustrated in FIGURE 5 into the other opposite end position thereof illustrated in dash and dot lines. A cross bore 40 is provided within the pin portion 35 which is in communication with the longitudinal bore 30. The annular member 34 itself is provided also with a cross bore 41 which is out of alignment, however, with the bore 40 in the end position illustrated in FIGURE 5. Outwardly thereof the cross bore 41 terminates in an annular groove 42 of the secondary shaft 32 which is in communication with a further cross bore 43 for the supply of the pressure oil.

*Operation*

The operation of the control system for the hydrodynamic coupling of FIGURES 4 and 5 is as follows.

During normal operation the engine 11 and/or 12, which may be operative at the particular time, transmits in the usual manner its torque to the output by way of the respective coupling 13 or 13' serving as a free-wheeling device. The respective coupling 13, 13' is thereby filled with liquid and the valves 27 are in the closure position thereof illustrated in FIGURE 4. Since the secondary shaft 32 by reason of the slippage in the coupling trails behind the primary shaft 31, the annular member 34 is rotated with respect to the pulling primary shaft 31 into the position illustrated in FIGURE 5 by the friction at the surfaces 38 of the secondary shaft 32. The pressure oil which is supplied through line 44 thereby finds no passage leading to the discharge valves 27.

If now the respective engine comes to a standstill or stops for any reason, for example, because it jams due to piston seizing, then the secondary shaft 32 overtakes the primary shaft 31. By reason of the inclined position of the blades the moment input capacity of the corresponding coupling drops to approximately $\frac{1}{5}$ to $\frac{1}{10}$ of the pre-existing value. Simultaneously therewith the annular member 34 passes over by reason of the effect of the spring 39 and the friction at the surfaces 38 of the secondary shaft 32 into the other end position shown in FIGURE 5 in dash and dot lines. In this latter end position the bore 41 is in alignment with the bore 40 in the primary shaft 31. The pressure oil thereby reaches the partial pistons 27' of the discharge valves 25 through the bores 29 and 30 and presses the discharge valves toward the left as viewed in the drawing against the effect of spring 28. The discharge bores 26 are thereby opened up and the coupling is discharged in the manner described hereinabove, possibly completely emptied whereby the moment input capacity drops to zero.

While I have shown and described one embodiment in accordance with the present invention, it is understood that the same is not limited thereto but is susceptible of numerous changes and modifications within the spirit and scope of the present invention, and I therefore do not wish to be limited to the details shown and described herein but intend to cover all such changes and modifications as are encompassed by the scope of the appended claims.

I claim:

1. A free-wheeling arrangement for operatively connecting at least one large propulsion unit to a common output, especially for multi-engine installations in marine propulsion systems, comprising:
common output means,
two drive means,
and torque transmitting connecting means operatively connecting said two drive means with said common output means including transmission means and, in the torque transmitting connection between each drive means and said common output means, hydrodynamic coupling means operable as a free-wheeling device,
said hydrodynamic coupling means operable as a free-wheeling device including a primary part provided with blade means inclined forwardly in the normal direction of rotation and a secondary part provided with blade means inclined rearwardly correspondingly.

2. A free-wheeling arrangement for operatively connecting at least one large propulsion unit to a common output, especially for multi-engine installations in marine propulsion systems, comprising:
common output means,
two drive means,
and torque transmitting connecting means operatively connecting said two drive means with said common output means including transmission means and, in the torque transmitting connection between each drive means and said common output means, hydrodynamic coupling means operable as a free-wheeling device,
said hydrodynamic coupling means operable as a free-wheeling device including a primary part provided with blade means inclined forwardly in the normal direction of rotation and a secondary part provided with blade means inclined rearwardly correspondingly,
disabling means for effectively disabling the respective torque-transmitting connection between a corresponding coupling means and said common output means,
and control means constituted by said hydrodynamic coupling means and operatively connected with said disabling means including speed-responsive means operable to render said disabling means effective during passage of the speed difference between the primary part and secondary part of said hydrodynamic coupling means through a value of approximately zero.

3. A free-wheeling arrangement for operatively connecting at least one large propulsion unit to a common output, especially for multi-engine installations in marine propulsion systems, comprising:
common output means,
two drive means,
and torque transmitting connecting means operatively connecting said two drive means with said common output means including transmission means and, in the torque transmitting connection between each drive means and said common output means, hydrodynamic coupling means operable as a free-wheeling device,
said hydrodynamic coupling means operable as a free-wheeling device including a primary part provided with blade means inclined forwardly in the normal direction of rotation and a secondary part provided with blade means inclined rearwardly correspondingly,
disabling means for effectively disabling the respective torque-transmitting connection between a corresponding coupling means and said common output means,
and control means constituted by said hydrodynamic coupling means and operatively connected with said disabling means including speed-responsive means operable to render said disabling means effective during passage of the speed difference between the primary part and secondary part of said hydrodynamic coupling means through a value of approximately zero,
said disabling means being constituted by said hydrodynamic coupling means itself which serves thereby simultaneously as a disconnecting clutch and which is operable to be automatically emptied by said control means during the passage of the primary and secondary parts through said speed difference value approximately equal to zero.

4. A free-wheeling arrangement for operatively connecting at least one large propulsion unit to a common output, especially for multi-engine installations in marine propulsion systems, comprising:
common output means,
two drive means,
torque transmitting connecting means operatively connecting said two drive means with said common output means including transmission means and, in the torque transmitting connection between a respective drive means and said common output means, hydrodynamic coupling means operable as free-wheeling device,
said hydrodynamic coupling means operable as a free-wheeling device including a primary part provided with blade means inclined forwardly in the normal direction of rotation and a secondary part provided with blade means inclined rearwardly correspondingly,
disabling means for effectively disabling the respective torque-transmitting connection between a corresponding coupling means and said common output means,
and control means including pulse-transmitter means constituted by said hydrodynamic coupling means operatively connected with said disabling means and operable to render said disabling means effective during passage of the speed difference between the primary part and secondary part of said hydrodynamic coupling means through a value of approximately zero,
said pulse transmitter means being formed by valve means operatively associated with both the primary and secondary parts of a respective coupling means, said valve means having two end positions and being operative to effectively block oil pressure in one end position and to release oil pressure in the other end position thereof.

5. A free-wheeling arrangement for operatively connecting at least one large propulsion unit to a common output, especially for multi-engine installations in marine propulsion systems, comprising:
common output means,
drive means,
torque transmitting connecting means operatively connecting said drive means with said common output means including, in the torque transmitting connection between a respective drive means and said common output means, hydrodynamic coupling means operable as a free-wheeling device,
said hydrodynamic coupling means including a primary part, a secondary part, and blade means which are cooperable with said primary and secondary parts and inclined forwardly in the normal direction of rotation thereof, disabling means for effectively disabling the respective torque-transmitting connection between a corresponding coupling means and said common output means, and control means including pulse-transmitter means constituted by said hydrodynamic coupling means operatively connected with said disabling means and operable to render said disabling means effective during passage of the speed difference between the primary part and secondary part of said hydrodynamic coupling means through a value of approximately zero, said pulse transmitter means being formed by valve means operatively associated with both the primary and secondary parts of a respective coupling means, said valve means having two end positions and being operative to effectively block oil pressure in one end position and to release oil pressure in the other end position thereof, said valve means including an annular member which is disposed between a first part operatively connected with said primary part and a second part operatively connected with said secondary part and which is in frictional engagement with one of said first and second parts by way of abutment surfaces, means including abutment means to enable limited relative rotation of said annular member relative to the other of said first and second parts, means normally urging said annular member into the one end position in which it releases the oil pressure, and means operable by frictional engagement between said annular member and said abutment surfaces for retaining said annular member in the other end position in which it blocks the oil pressure whereby said valve means releases the oil pressure only when the rotational speed difference between the primary and secondary parts becomes approximately zero.

6. A free-wheeling arrangement for operatively connecting at least one large propulsion unit to a common output, especially for multi-engine installations in marine propulsion systems, comprising:

common output means, two drive means, torque-transmitting connecting means operatively connecting said two drive means with said common output means including transmission means and, in the torque transmitting connection between a respective drive means and said common output means, hydrodynamic coupling means operable as a free-wheeling device, said hydrodynamic coupling means including a primary part provided with blade means inclined forwardly in the normal direction of rotation and a secondary part provided with blade means inclined rearwardly correspondingly, a primary shaft connected with said primary part, and a secondary shaft connected to said secondary part, disabling means for effectively disabling the respective torque-transmitting connection between a corresponding coupling means and said common output means, and control means including pulse transmitting means constituted by said hydrodynamic coupling means operatively connected with said disabling means and operable to render said disabling means effective during passage of the speed difference between the primary part and secondary part of said hydrodynamic coupling means through a value of approximately zero, said pulse transmitter means including valve means having two end positions and being operative to effectively block oil pressure in one end position and releasing oil pressure in the other end position thereof, said valve means including an annular member which is disposed between a first portion of said primary shaft and a second portion of said secondary shaft, said annular member being provided with a transverse bore which, with said annular member in one position thereof, is in substantial alignment with a further bore provided in one of said portions, the other portion being provided with an annular groove in which terminates said first-mentioned transverse bore and with a cross bore in communication with said annular groove for the supply of oil under pressure.

7. A free-wheeling arrangement for operatively connecting at least one large propulsion unit to a common output, especially for multi-engine installations in marine propulsion systems, comprising:

common output means, drive means, torque-transmitting connecting means operatively connecting said drive means with said common output means including, in the torque transmitting connection between a respective drive means and said common output means, hydrodynamic coupling means operable as a free-wheeling device, said hydrodynamic coupling means including a primary part, a secondary part, and blade means which are cooperable with said primary and secondary parts and inclined forwardly in the normal direction of rotation thereof, disabling means for effectively disabling the respective torque-transmitting connection between a corresponding coupling means and said common output means, and control means including pulse transmitter means constituted by said hydrodynamic coupling means operatively connected with said disabling means and operable to render said disabling means effective during passage of the speed difference between the primary part and secondary part of said hydrodynamic coupling means through a value of approximately zero, said pulse transmitter means being formed by valve means operatively associated with both the primary and secondary parts of a respective coupling means, said valve means having two end positions and being operative to effectively block oil pressure in one end position and to release oil pressure in the other end position thereof, said valve means including an annular member which is disposed between a first part operatively connected with said primary part and a second part operatively connected with said secondary part and which is in frictional engagement with one of said first and second parts by way of abutment surfaces, means including abutment means to enable limited relative rotation of said annular member relative to the other of said first and second parts, means normally urging said annular member into the one end position in which it releases the oil pressure, and means operable by frictional engagement between said annular member and said abutment surfaces for retaining said annular member in the other end position in which it blocks the oil pressure whereby said valve means releases the oil pressure only when the rotational speed difference between the primary and secondary parts becomes approximately zero, said other part being an axle stub of the primary shaft connected with said primary part, said annular member being disposed on said axle stub and being provided with a transverse bore which, with said annular member in said one end position, is in substantial alignment wth a further bore provided in said axle stub, said one part being formed by the secondary shaft which is provided with an annular groove in which terminates said first-mentioned transverse bore and with a cross bore in communication with said annular groove for the supply of oil under pressure.

8. A free-wheeling arrangement for operatively connecting at least one large propulsion unit to a common output, especially for multi-engine installations in marine propulsion systems, comprising:
common output means,
two drive means,
torque-transmitting connecting means operatively connecting said two drive means with said common output means including transmission means and, in the torque transmitting connection between a respective drive means and said common output means, hydrodynamic coupling means operable as a free-wheeling device;
said hydrodynamic coupling means including a primary part provided with blade means inclined forwardly in the normal direction of rotation and a secondary part provided with blade means inclined rearwardly correspondingly, a primary shaft connected with said primary part, and a secondary shaft connected to said secondary part,
disabling means for effectively disabling the respective torque-transmitting connection between a corresponding coupling means and said common output means, and control means including pulse transmitting means constituted by said hydrodyamic coupling means operatively connected with said disabling means and operable to render said disabling means effective during passage of the speed difference between the primary part and secondary part of said hydrodynamic coupling means through a value of approximately zero,
said disabling means being constituted by said hydrodynamic coupling means itself which serves thereby simultaneously as disconnecting clutch and is operable to be automatically emptied by said control means during the passage of the primary and secondary parts through the speed difference value approximately equal to zero,
said pulse transmitter means including valve means having two end positions and being operative to effectively block oil pressure in one end position and releasing oil pressure in the other end position thereof,
said valve means including an annular member which is disposed between a first portion of said primary shaft and a second portion of said secondary shaft,
said annular member being provided with a transverse bore which, with said annular member in one position thereof, is in substantial alignment with a further bore provided in one of said portions, the other portion being provided with an annular groove in which terminates said first-mentioned transverse bore and with a cross bore in communication with said annular groove for the supply of oil under pressure.

9. A free-wheeling arrangement for operatively connecting at least one large propulsion unit to a common output, especially for multi-engine installations in marine propulsion systems, comprising:
common output means,
drive means,
torque transmitting connecting means operatively connecting said drive means with said common output means including, in the torque transmitting connection between a respective drive means and said common output means, hydrodynamic coupling means operable as a free-wheeling device,
said hydrodynamic coupling means including a primary part, a secondary part, and blade means which are cooperable with said primary and secondary parts and inclined forwardly in the normal direction of rotation thereof,
disabling means for effectively disabling the respective torque-transmitting connection between a corresponding coupling means and said common output means,
and control means including pulse transmitter means constituted by said hydrodynamic coupling means operatively connected with said disabling means and operable to render said disabling means effective during passage of the speed difference between the primary part and secondary part of said hydrodynamic coupling means through a value of approximately zero,
said disabling means being constituted by said hydrodynamic coupling means itself which serves thereby simultaneously as disconnecting clutch and is operable to be automatically emptied by said control means during the passage of the primary and secondary parts through said speed difference value approximately equal to zero,
the blade means at the primary part of said hydrodynamic coupling means serving as free-wheeling device being disposed with a forward inclination, as seen in the unfolded condition thereof, and the blade means at the secondary part being similarly inclined,
said pulse transmitter means being formed by valve means operatively associated with both the primary and secondary parts of a respective coupling means, said valve means having two end positions and being operative to effectively block oil pressure in one end position and to release oil pressure in the other end position thereof,
said valve means including an annular member which is disposed between a first part operatively connected with said primary part and a second part operatively connected with said secondary part and which is in frictional engagement with one of said first and second parts by way of abutment surfaces, means including abutment means to enable limited relative rotation of said annular member relative to the other of said first and second parts, means normally urging said annular member into the one end position in which it releases the oil pressure and means operable by frictional engagement between said annular member and said abutment surfaces for retaining said annular member in the other end position in which it blocks the oil pressure whereby said valve means releases the oil pressure only when the rotational speed difference between the primary and secondary parts becomes approximately zero,
said other part being an axle stub of the primary shaft connected with said primary part, said annular member being disposed on said axle stub and being provided with a transverse bore which, with said annular member in said one end position, is in substantial alignment wth a further bore provided in said axle stub, said one part being formed by the secondary shaft which is provided with an annular groove in which terminates said first-mentioned transverse bore and with a cross bore in communication with said annular groove for the supply of oil under pressure.

10. A free-wheeling arrangement for operatively connecting at least one large propulsion unit to a common output, especially for multi-engine installations in marine propulsion systems, comprising:
common output means,
two drive means,
torque-transmitting connecting means operatively connecting said two drive means with said common output means including transmission means and, in the torque transmitting connection between a respective drive means and said common output means, hydrodynamic coupling means operable as a free-wheeling device,
said hydrodynamic coupling means operable as a free-wheeling device including a primary part provided with blade means inclined forwardly in the normal direction of rotation and a secondary part provided with blade means inclined rearwardly correspondingly,
disabling means including a disconnecting clutch for effectively disabling the respective torque-transmitting connection between a corresponding coupling means and said common output means, and control means operatively connected with said disabling means including pulse transmitter means constituted by said hydrodynamic coupling means and operable to render said disabling means effective during passage of the speed difference between the primary part and secondary part of said hydrodynamic coupling means through a value of approximately zero, said pulse-transmitter means being constructed as valve means operatively associated with both the primary and secondary parts of a respective coupling means and valving a hydraulic medium under pressure, said valve means having two end positions and being operable to effectively block said hydraulic medium in one end position and releasing said hydraulic medium in the other end position thereof, and means for applying said hydraulic medium to said disabling means for disengaging said disconnecting clutch.

11. A free-wheeling arrangement according to claim 10 wherein said hydraulic medium controls the disengagement of the disconnecting clutch indirectly.

12. A free-wheeling arrangement according to claim 10 wherein said hydraulic medium controls the disengagement of the disconnecting clutch directly.

13. A free-wheeling arrangement for operatively connecting at least one large propulsion unit to a common output, especially for multi-engine installations in marine propulsion systems, comprising:
  common output means,
  two drive means,
  torque-transmitting connecting means operatively connecting said two drive means with said common output means including transmission means and, in the torque transmitting connection between a respective drive means and said common output means, hydrodynamic coupling means operable as a free-wheeling device,
  said hydrodynamic coupling means operable as a free-wheeling device including a primary part provided with blade means inclined forwardly in the normal direction of rotation and a secondary part provided with blade means inclined rearwardly correspondingly,
  disabling means effectively constituted by said hydrodynamic coupling means for effectively disabling the respective torque-transmitting connection between a corresponding coupling means and said common output means,
  and control means operatively connected with said disabling means including pulse transmitter means constituted by said hydrodynamic coupling means and operable to render said disabling means effective during passage of the speed difference between the primary part and secondary part of said hydrodynamic coupling means through a value of approximately zero,
  said pulse-transmitter means being constructed as valve means operatively associated with both the primary and secondary parts of a respective coupling means and valving a hydraulic medium under pressure, said valve means having two end positions and being operable to effectively block said hydraulic medium in one end position and releasing said hydraulic medium in the other end position thereof, and means for applying said hydraulic medium to said disabling means for emptying said hydrodynamic coupling means.

14. A free-wheeling arrangement according to claim 13 wherein said hydraulic medium controls directly the the emptying of said hydrodynamic coupling.

15. A free-wheeling arrangement according to claim 13 wherein said hydraulic medium controls directly the emptying of said hydrodynamic coupling.

16. A free-wheeling arrangement for operatively connecting at least one large propulsion unit to a common output, especially for multi-engine installations in marine propulsion systems, comprising:
  common output means,
  drive means,
  torque-transmitting connecting means operatively connecting said drive means with said common output means including, in the torque transmitting connection between a respective drive means and said common output means, hydrodynamic coupling means operable as a free-wheeling device,
  said hydrodynamic coupling means including a primary part, a secondary part, and blade means which are cooperable with said primary and secondary parts and inclined forwardly in the normal direction of rotation thereof,
  disabling means effectively constituted by said hydrodynamic coupling means for effectively disabling the respective torque-transmitting connection between a corresponding coupling means and said common output means,
  and control means operatively connected with said disabling means including pulse transmitter means constituted by said hydrodynamic coupling means and operable to render said disabling means effective during passage of the speed difference between the primary part and secondary part of said hydrodynamic coupling means through a value of approximately zero,
  said pulse-transmitter means being constructed as valve means operatively associated with both the primary and secondary parts of a respective coupling means and valving a hydraulic medium under pressure, said valve means having two end positions and being operable to effectively block said hydraulic medium in one end position and releasing said hydraulic medium in the other end position thereof,
  and conduit means for applying said hydraulic medium to said disabling means for emptying said hydrodynamic coupling means,
  said primary part forming a rotary housing provided with substantially radially extending apertures along the circumference thereof, discharge valve means for said apertures, spring means normally holding said discharge valves in the closure position thereof, said hydraulic medium being operable upon application to said discharge valve means through said conduit means to open said discharge valve means substantially in unison.

17. A hydrodynamic coupling operable as a free-wheeling device and adapted to be automatically emptied, comprising:
  a primary member,
  a secondary member,
  said primary and secondary members effectively forming a working space for the hydraulic fluid,
  blade means for said primary and secondary members within said working space, the blade means of said primary member being inclined forwardly in the normal direction of rotation and the blade means for the secondary member being inclined rearwardly correspondingly,
  discharge aperture means provided outwardly along the circumference of said primary part,
  valve means for valving said discharge aperture means,
  and control means for controlling said valve means in dependence on the rotational speed difference between said primary member and said secondary member.

18. A hydrodynamic coupling operable as a free-wheeling device and adapted to be automatically emptied, comprising:
  a primary member,
  a secondary member,
  said primary and secondary members effectively forming a working space for the hydraulic fluid, discharge aperture means provided outwardly along the circumference of said primary part, valve means operable by a hydraulic pressure medium for valving said discharge aperture means, and control means for controlling said valve means in dependence on the rotational speed difference between said primary member and said secondary member, said control means including conduit means leading to said valve means for the application thereto of the hydraulic pressure medium, an annular member located between a first part operatively connected with said primary part and a second part operatively connected with said secondary part, said annular member being in frictional contact with one of said parts, further valve means in said conduit means including said annular member, means to enable limited relative movement of said annular member relative to the other of said parts to provide two end positions for said annular member, said annular member in one end position thereof blocking said conduit means and opening said conduit means in the other end position into which it is urged when the rotational speed difference between said primary and secondary parts approaches zero.

19. A hydrodynamic coupling operable as a free-wheeling device and adapted to be automatically emptied, comprising:

a primary member, a secondary member, said primary and secondary members effectively forming a working space for the hydraulic fluid, discharge aperture means provided outwardly along the circumference of said primary part, valve means operable by a hydraulic pressure medium for valving said discharge aperture means, and control means for controlling said valve means in dependence on the rotational speed difference between said primary member and said secondary member, said control means including conduit means leading to said valve means for the application thereto of the hydraulic pressure medium, an annular member located between a first part operatively connected with said primary part and a second part operatively connected with said secondary part, said annular member being in frictional contact with one of said parts, further valve means in said conduit means including said annular member, means to enable limited relative movement of said annular member relative to the other of said parts to provide two end positions for said annular member, said annular member in one end position thereof, in which it is normally held by frictional engagement with said one part when the rotational speed of said primary part is greater than that of said secondary part, blocking said conduit means and opening said conduit means in the other end position into which it is urged when the rotational parts approaches zero, a first cross bore in said annular member, an annular groove in one said two parts and in permanent communication with said first bore, a second bore in said last-mentioned one part and in permanent communication with annular groove, and a third bore adapted to align with said first bore in one of said end positions.

References Cited by the Examiner

UNITED STATES PATENTS

| | | | |
|---|---|---|---|
| 2,256,878 | 9/1941 | Black | 60—54 |
| 2,298,105 | 10/1942 | Canaan | 60—54 |
| 2,325,090 | 7/1943 | Alison | 60—54 |
| 2,521,117 | 9/1946 | Du Bois et al. | 60—54 |
| 2,656,675 | 10/1953 | Coar | 74—730 X |
| 2,663,148 | 12/1953 | Jandasek | 60—54 |
| 2,878,691 | 3/1959 | Schjolin | 74—675 |
| 2,910,889 | 11/1959 | Lackey | 74—661 |
| 2,944,441 | 7/1960 | Russell | 74—677 |

FOREIGN PATENTS 947,290   8/1956   Germany.

OTHER REFERENCES

German printed application, Feb. 25, 1960, 1,076,451 (1 sht. dwg., 2 pp. spec.) (Mangelsdorf).

DON A. WAITE, *Primary Examiner.*